United States Patent [19]

Pirnie, III

[11] 4,052,569

[45] Oct. 4, 1977

[54] EMERGENCY CALL ANSWERING SYSTEM

[75] Inventor: Robert M. Pirnie, III, Montgomery, Ala.

[73] Assignee: Communication Equipment & Contracting Co., Inc., Union Springs, Ala.

[21] Appl. No.: 701,551

[22] Filed: July 9, 1976

[51] Int. Cl.² .............................................. H04M 3/50
[52] U.S. Cl. ........................... 179/27 FH; 179/18 BD
[58] Field of Search ............ 179/27 FH, 18 B, 18 BD

[56] References Cited

U.S. PATENT DOCUMENTS

| | | | |
|---|---|---|---|
| 3,489,857 | 1/1970 | Pharis | 179/18 BD |
| 3,542,966 | 11/1970 | Schluter et al. | 179/18 BD |
| 3,637,947 | 1/1972 | Breen | 179/27 FH |

*Primary Examiner*—William C. Cooper
*Attorney, Agent, or Firm*—Wilkinson, Mawhinney & Theibault

[57] ABSTRACT

The 911 Emergency Call Answering System provides specialized console controlled emergency call handling capabilities for 911 answer locations. Answer, conference and transfer capabilities are incorporated in each position. As calls are received by the system they are automatically distributed to the emergency operator positions. A 911 call will appear at only one emergency operator position. Calls are allotted to emergency operators on a sequential basis. The 911 Emergency Call Answering System provides emergency line outputs connected directly with the emergency response agencies. These outputs are accessed on an individual basis from each 911 emergency operator position by pressing the discrete key for each emergency response agency. All calls arriving at the 911 emergency operator positions are under the control of those positions.

1 Claim, 2 Drawing Figures

EMERGENCY CALL ANSWERING SYSTEM

The present invention is an improvement over my prior U.S. Pat. Nos. 3,780,227 and 2,864,526 employing the trunk group circuits connected to the central office and the position groups thence to the position console where it is connected directly to the selected emergency response agency.

An object of the present invention is to provide a system for handling 911 emergency calls which provides a specialized console controlled emergency call handling capability so that as calls are received by the system they are automatically distributed to the emergency operator positions. A 911 call will appear at only one emergency operator position and calls will be alloted to emergency operators on a sequential basis.

A further object of the present invention is an emergency call answering system which provides emergency line outputs connected directly with emergency response agencies such as police, fire, ambulance, hospital or utilities. These outputs are accessed on an individual basis from each 911 emergency operator position by pressing the discrete key for each emergency response agency on the operator console.

A further object of the present invention is to provide an emergency call answering system which provides municipalities with equipment for centralized emergency call answering. As the system provides call allotting to individual positions load leveling among emergency operators is achieved thus reducing the operator manning requirements. Trunk identification or automatic number identification is provided to facilitate call handling. All call handling is accomplished through console operations providing modern appearance, speed of operation and operator acceptance.

With the foregoing and other objects in view the invention will be more fully described hereinafter and more particularly pointed out in the appended claims.

In the drawings in which like parts are denoted by reference characters throughout the several views.

Figure 1:
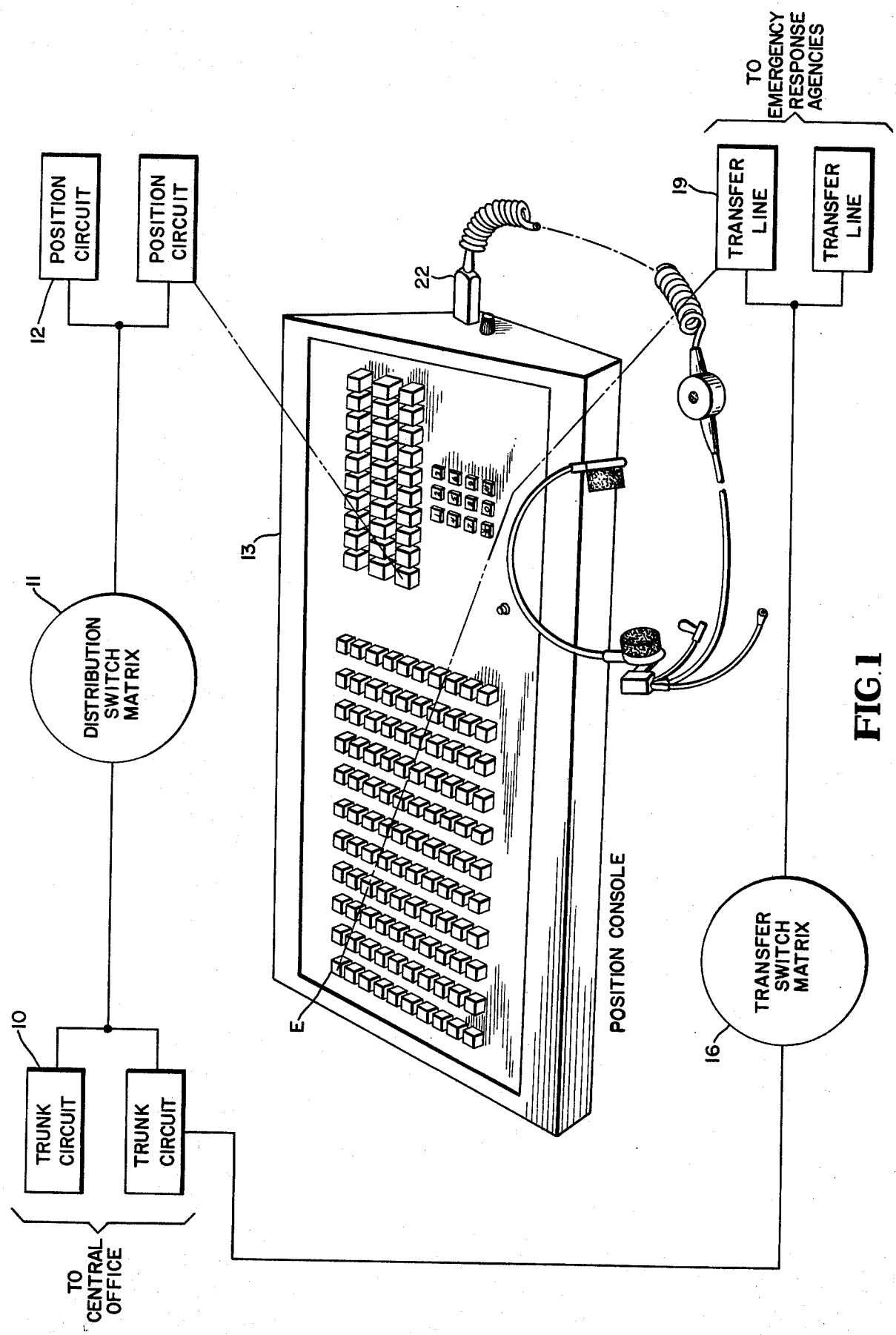
FIG. 1 is a diagrammatic view of the trunk circuits, position circuits and console for direct connection to an emergency response agency.
Figure 2:
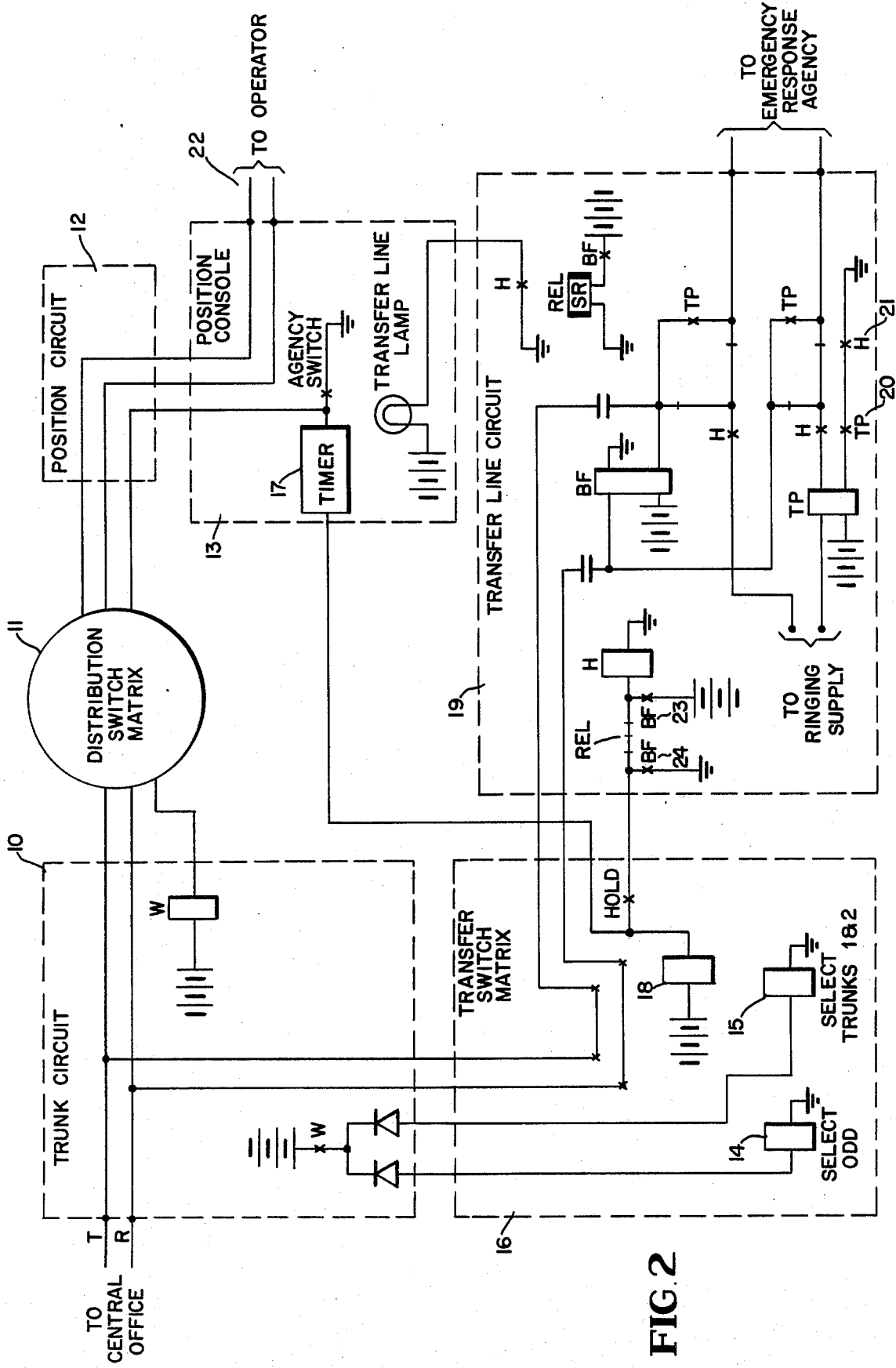
FIG. 2 is an electrical schematic of the system of FIG. 1.

Referring now to the drawings, an incoming call to trunk circuit 10 is directed through the distribution switch matrix 11, thence to position circuit 12 and to position console 13.

The operator at console 13 determines which emergency response agency is needed and closes the selected agency switch E on the console 13 which operates relay W in trunk circuit 10 energizing the two trunk select magnets 14, 15 in the transfer switch matrix 16 which controls the trunk coordinate of the transfer switch matrix 16. A timer 17 operates an energizing hold magnet 18 in matrix 16 establishing an audio path from the trunk circuit 10 to the transfer line circuit 19. The operation of magnet 18 operates the H relay of the transfer line circuit 19 which rings the selected emergency response agency and illuminates the transfer line lamp in the position console 13.

Upon the emergency response agency answering the TP relay of the transfer line circuit 19 operates and locks through its own contacts 20 and H relay contact 21, removing ringing from the emergency response agency line and establishes the audio line from the agency to the calling party on trunk circuit 10 and the position operator 22. The BF relay of transfer line circuit 19 operates providing power to the emergency response agency telephone which operates the REL relay, transfers a locking path for the H relay of the transfer line circuit 19 through BF contacts 23 and transfers the locking path of the hold magnet 18 of the transfer switch matrix 16 through BF contacts 24.

There is a unique agency line switch and transfer line circuit 19 for each emergency response agency.

To release the emergency response agency audio circuit they place the phone on hook which releases the BF relay which in turn releases the H relay of transfer line circuit 19 and the hold magnet 18 of the transfer line switch matrix 16. The slow release relay REL of the transfer line circuit 19 releases restoring the system to receive another call.

What I claim is:

1. In an emergency call answering system having a plurality of incoming trunk circuits connected through a distribution switch matrix to a plurality of answering position circuits:
    the improvement comprising a position console selectively connectable to a line transfer circuit through a selectable switch connectable to the answering position circuit and through a transfer line and transfer switch matrix to a selected emergency response agency, said single switch establishing a signal and audio circuit through said switch matrices from the incoming trunk circuit to said transfer line circuit to select and ring on a line to an emergency response agency so that upon answer by an emergency response agency it is connected directly to the incoming trunk circuit initiating the call and to the console operator.

* * * * *